United States Patent
Bitar et al.

(10) Patent No.: US 7,408,946 B2
(45) Date of Patent: Aug. 5, 2008

(54) SYSTEMS AND METHODS FOR SMOOTH AND EFFICIENT ROUND-ROBIN SCHEDULING

(75) Inventors: Nabil N. Bitar, Winchester, MA (US); Philip To, Burlington, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1010 days.

(21) Appl. No.: 10/838,778

(22) Filed: May 3, 2004

(65) Prior Publication Data

US 2005/0243847 A1    Nov. 3, 2005

(51) Int. Cl.
H04L 12/28    (2006.01)
H04L 12/56    (2006.01)

(52) U.S. Cl. .................. 370/412; 370/468; 370/235

(58) Field of Classification Search .............. 370/235, 370/468, 395.21, 230, 395.4, 395.42, 395.43, 370/395.41, 231–236, 412–418, 389, 392
See application file for complete search history.

(56) References Cited

U.S. PATENT DOCUMENTS

| | | | | |
|---|---|---|---|---|
| 5,864,540 A | * | 1/1999 | Bonomi et al. | 370/235 |
| 5,926,458 A | * | 7/1999 | Yin | 370/230 |
| 6,104,700 A | * | 8/2000 | Haddock et al. | 370/235 |
| 6,240,066 B1 | * | 5/2001 | Nagarajan et al. | 370/230 |
| 6,359,861 B1 | * | 3/2002 | Sui et al. | 370/230 |
| 6,438,134 B1 | * | 8/2002 | Chow et al. | 370/412 |
| 6,570,883 B1 | * | 5/2003 | Wong | 370/412 |
| 6,917,591 B2 | * | 7/2005 | St. John | 370/235 |
| 7,031,343 B1 | * | 4/2006 | Kuo et al. | 370/473 |

* cited by examiner

*Primary Examiner*—Edan Orgad
*Assistant Examiner*—Chuong Ho

(57) ABSTRACT

The present invention provides improved work schedulers for computer systems and communication processors. A preferred embodiment of the present invention includes systems with buffer memory for storing one or more communication packets or work requests arranged on a plurality of scheduling queues and information for controlling the scheduling of the queues, with output processors for outputting packets from the buffer memory; and with control processors for performing the scheduling methods of this invention. The scheduling methods repetitively initialize each queue's service credits, repetitively process each queue in a round-robin order by granting each queue with remaining service credits no more than one quantum of service and updating that queue's service credits to reflect the service actually used and the service available for use but not actually used.

Figure 1:
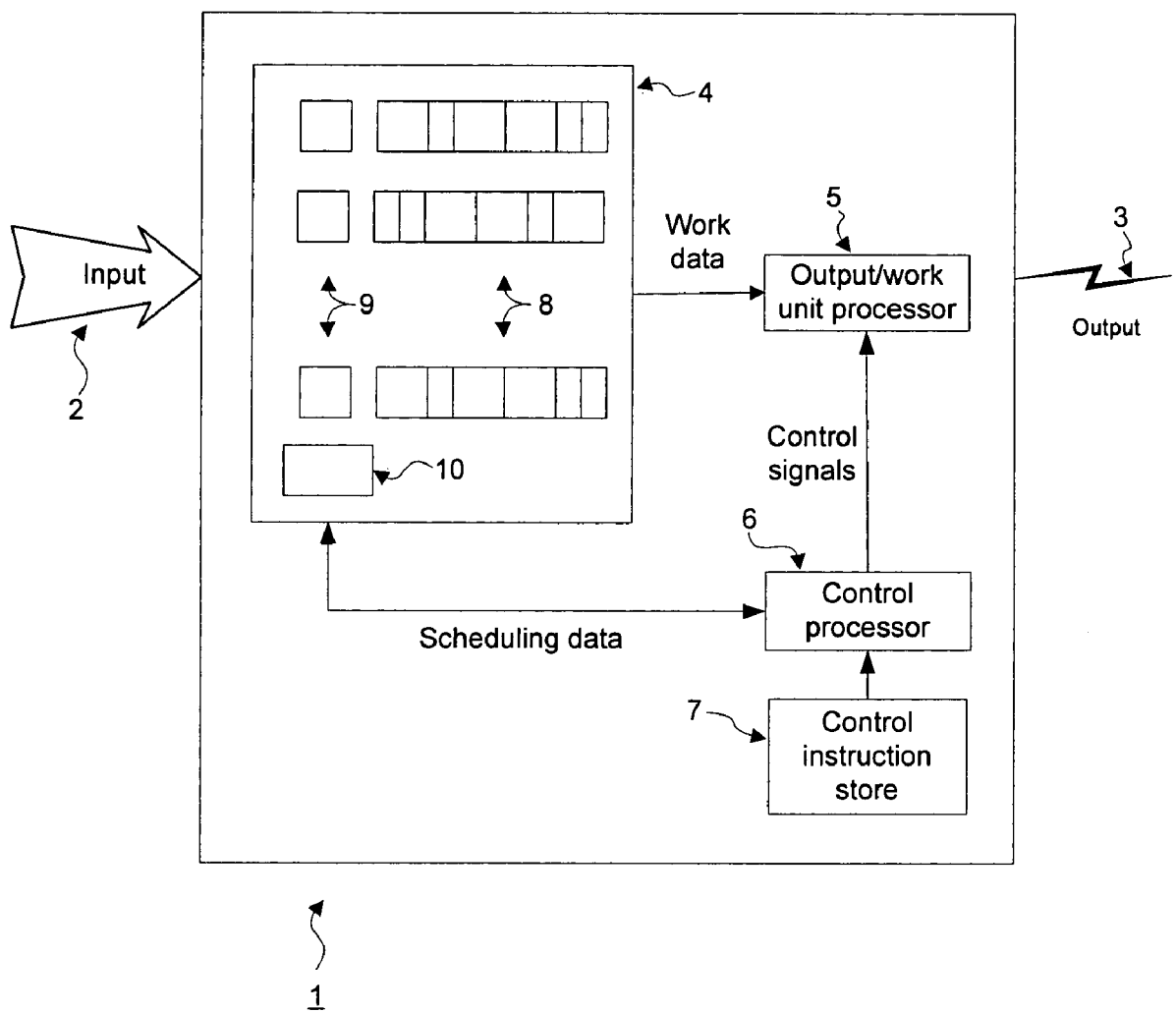

23 Claims, 3 Drawing Sheets

SYSTEMS AND METHODS FOR SMOOTH AND EFFICIENT ROUND-ROBIN SCHEDULING

This application incorporates by reference in their entireties and for all purposes the following patent applications, all of which are owned or subject to a right of assignment to the assignee of the present application and all of which were filed concurrently together with the present application: (1) the application titled "SYSTEMS AND METHODS IMPLEMENTING 1+1 AND N:1 LINE CARD REDUNDANCY", by Bitar et al. and identified by BITAR 6-10 (Ser. No. 10/838781) (hereafter, the "Redundancy application"); (2) the application titled "METHODS AND SYSTEMS FOR EFFICIENT MULTICAST ACROSS A MESH BACKPLANE", by Bitar et al. and identified by BITAR 7-11-1 (Ser. No. 10/838781) (hereafter, the "Multicast application"); (3) the application titled "VARIABLE PACKET-SIZE BACKPLANES FOR SWITCHING AND ROUTING SYSTEMS", by Bitar et al. and identified by BITAR 5-9-3 (Ser. No. 10/838780) (hereafter, the "Variably-sized FDU application"); and (4) the application titled "A UNIFIED SCHEDULING AND QUEUEING ARCHITECTURE FOR A MULTISERVICE SWITCH", by Bitar et al. and identified by BITAR 4-8-2 (Ser. No. 10/838788) (hereafter, the "Scheduler application").

1. FIELD OF THE INVENTION

The present invention relates generally to work scheduling in computer systems, and more particularly in communications systems such as switches and routers, and provides smooth and efficient round-robin-based scheduling methods in such systems.

2. BACKGROUND OF THE INVENTION

Round-robin ("RR") is a work-scheduling technique that has been used in many types of computer systems. Standard RR scans work queues, on which pending work is stored, repetitively and in a fixed order. Each queue is allocated a fixed amount of time. When a queue with pending work is found, some or all of these pending requests are processed within the fixed amount of time. The request is a data packet in communication networks. In a typical implementation of RR, the RR scheduler scans work queues on which pending work is stored, repetitively and in a fixed order, and when a queue with pending work is found, a single request is processed. However, the request service may vary in duration. Standard RR is computationally very efficient, but it lacks controllability and is prone in both cases to undesirable "burstiness", and "unfairness". Generally, scheduling "fairness" is understood to mean providing service to queues in a fair manner, such as by providing each queue equal service on average. Other implementation of RR, referred to as Weighted Round Robin (WRR), attempt to allocate each queue a number of requests that are eligible for service in a round. In this case, the RR scheduler scans work queues on which pending work is stored, repetitively and in a fixed order, and when a queue with pending work is found, up to the assigned number of requests eligible for service in a round are processed from that queue. WRR still faces the same issues of burstiness and unfairness (in the presence of service requests that take variable time) as RR.

Thus standard WRR has been modified in various ways to overcome such drawbacks. See, e.g., Shreedhar et al., 1996, *IEEE/ACM Trans. on Networking* 4(3), pp. 375-385. An example of a variant WRR scheduling technique now believed to be used in communication switches with variable packet sizes repetitively performs the steps of assigning each queue a service weight and then servicing each queue with backlogged data until the assigned service weight is exhausted. However the service weight is measured, entire packets must be transmitted in their entirety in order to avoid packet corruption due to the interleaving of different packets on output links. Although this variant RR technique does grant all work queues on average their assigned service even if one or more of the queues are continuously backlogged, it can often cause undesirable short-term variance in packet throughput (jitter) as well as burstiness.

Similarly, other known variant RR techniques that improve one aspect of scheduling service often do so at the cost of unintended consequences for other aspects of scheduling service. Accordingly, what is needed in the scheduling arts are schedulers controllable to achieve determined service goals (also referred to as quality-of-service (QOS) goals) while retaining the computational efficiency. Computational efficiency is particularly key in modern communication switches and routers that need to service packet queues on modern high-throughput communication links (often at speeds excess of 100, or 200, or 500, or more megabits/sec).

Citation or identification of any reference in this section or any section of this application shall not be construed that such reference is available as prior art to the present invention.

3. SUMMARY OF THE INVENTION

The present invention overcomes these identified prior-art problems, providing methods for RR-based scheduling that offer fair, controllable processing of work from multiple queues with improved average and maximum queuing delays and reduced short-term burstiness and jitter. The provided methods are computationally efficient and simple to implement.

Basically, the present invention employs improved "time-slicing" to grant service to queued work. The preferred method uses two-level time-slicing that divides scheduling into a series of "frames", where each frame sub-divided into one or more "sub-frames". Service fairness and controllability are largely provided at the frame level by granting each queue service in the proportion to an assigned numerical weight. Once a queue has reached its assigned weighted service in a frame, it is not granted further service until all the other active queues have also received their assigned weighted service, after which a new frame begins with the assigned weights appropriately updated. Burstiness, jitter, and latency are largely controlled at the sub-frame level by limiting the maximum continuous service any queue may receive to a pre-determined service quantum, which is preferably the same for all queues. Once a queue has received a service quantum in a sub-frame, its service is interrupted and other active queues are serviced preferably in a RR order, after which a new sub-frame begins. A queue may not receive a quantum worth of service in a sub-frame if it does not have enough requests that amount to a quantum or if the service of the next request causes a queue service to exceed a quantum in a sub-frame.

The service quantum is chosen preferably in view of the nature of the work requests and of the system hardware. For example, in the case of communication packet processing, the service quantum is typically a number of bytes, and may be chosen to equal the maximum physical transmission unit (packet, or packet segment, or cell, or the like) on the output communications links.

This invention has further preferred embodiments differing principally in how the service used by a queue is tracked. In one such embodiment, once a queue has been selected in a sub-frame to receive a quantum of service, it is considered to have used the entire service quantum even if the actual service needed was less than a service quantum. In effect, so the unused portion of the service quantum is forfeited. Here, assigned service in a frame is preferably in units of the service quantum, so that a queue will have exhausted its service assigned in a current frame when it has been selected for service in a number, M, of sub-frames of the current frame, where M is the number of service quanta assigned to the queue in the current frame. In particular, this embodiment is preferred where the work to be scheduled naturally divides into substantially equal sized increments, which may serve as the service quantum.

In another embodiment, a credit count ("CC") is maintained for each queue that records during each frame the amount of service available in the service quanta granted in the sub-frames of the current frame that was not actually used by the queue. For example, in the case of communication packet processing where the assigned service quantum is preferably number of bytes, the current credit count tracks the cumulative number of bytes of the granted service quanta minus the cumulative number of bytes in actually-processed packets. Instead of forfeiting this unused service, each queue's assigned service weights are altered so that it may receive extra service opportunities until its assigned service for the current frame is actually all used. In one variant of this embodiment, service weights are altered only within each frame, the pre-determined assigned weights being used again in the next frame. In another variant, the credit count from a prior frame is carried over (as a residual credit ("RC")) and used to adjust the assigned service weights in the subsequent frame.

This latter embodiment is preferred where the work to be scheduled is variable, not having natural equal sized increments. In such an environment, the preceding embodiment (which forfeits unused service) may unfairly treat queues having work requests (for example, communication packets) of different sizes. A queue with longer work requests will typically use more of each assigned service quantum than will a queue with shorter average work requests. If a credit count (reflecting unused service) is not maintained, then queues with longer work requests may systematically and unintentionally receive more service than queues with shorter work requests. An example of such an environment is a communication switch or router handling both internet protocol (IP) and asynchronous transfer mode (ATM) packet flows.

Further, in a variable-work-request environment, certain queues may have expected maximum work requests (for example, maximum allowed communication packet sizes) substantially larger than the expected maximum sizes of other queues. Simply assigning the service quantum to be at least as large as the largest expected maximum work request would most likely adversely affect general scheduler characteristics, for example, by increasing the latency or burstiness for queues with smaller maximum work request sizes. Thus, it may be advantageous to adjust the service quantum for such queues, for example, by setting the service quantum to the accumulated credit count if the latter becomes larger than the assigned service quantum. Then, a queue with a pending work request requiring more than the assigned service quantum will wait as the credit count increases in each sub-frame in service-quantum increments until the first sub-frame in which the accumulated credit count exceeds the work request size. Only then will this large work request be serviced. Since the remaining queues will be normally serviced, the impact of large packets will be limited largely to the queue in which they occur.

In the following the term "indicia" is used to refer to the variables used by the scheduling methods, both control information supplied by a user and information accumulated during operation of the method. It is to be understood that different indicia or sets of indicia are useful in different embodiments.

Accordingly, this invention is applicable in computer systems needing controllable, fair, and efficient scheduling of variable-sized work requests, such as work units for CPU processing, or resource requests for exclusive use of a resource, or the transmission of communication packets, or the like. This invention may be implemented in systems ranging from complete, standalone systems to embedded sub-systems.

In most cases, a system or sub-system suitable for these methods will have memories to store work requests, such as communication packets, waiting for processing, computing elements that performs the methods of this invention, processing elements that actually carry out scheduled work requests, interfaces to receive new work and send complete work, and the like. These functional elements may be physically separate of physically combined. For example, these methods are applicable to communication processors or processor cards that may have communication line interfaces for, e.g., LANs, wide area networks, switch fabrics, and so forth; processors for sending and receiving packets; buffer memories to store packets; and scheduler processor for performing these scheduling methods.

In further embodiments, this invention also includes computer readable media (such as a CD-ROM and also network file transfer) with instructions for causing a processor or system to perform the methods of this invention, special purpose integrated circuits designed to perform the methods of this invention, and the like.

4. BRIEF DESCRIPTION OF THE DRAWINGS

Figure 2A:
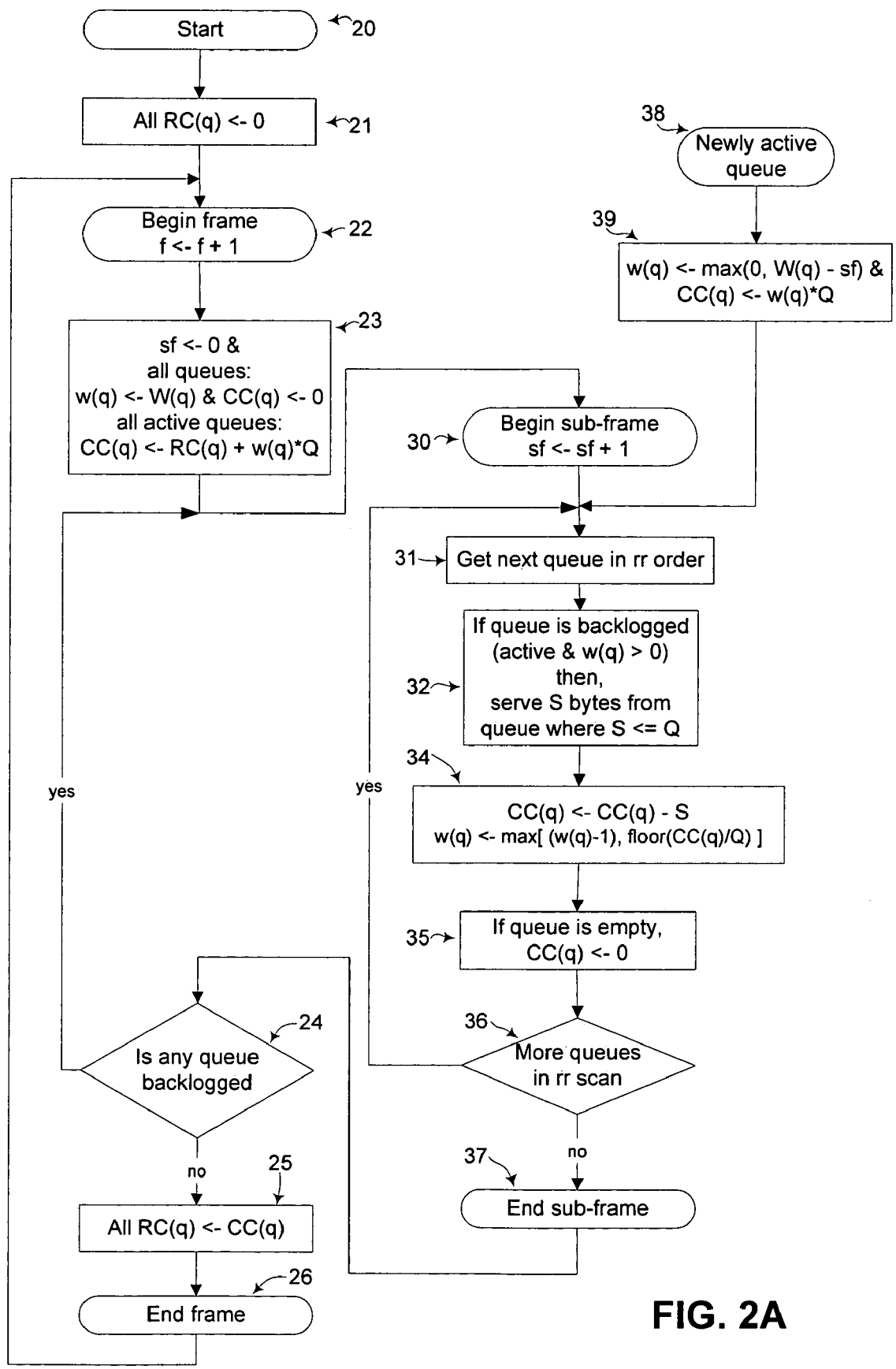
Figure 2B:
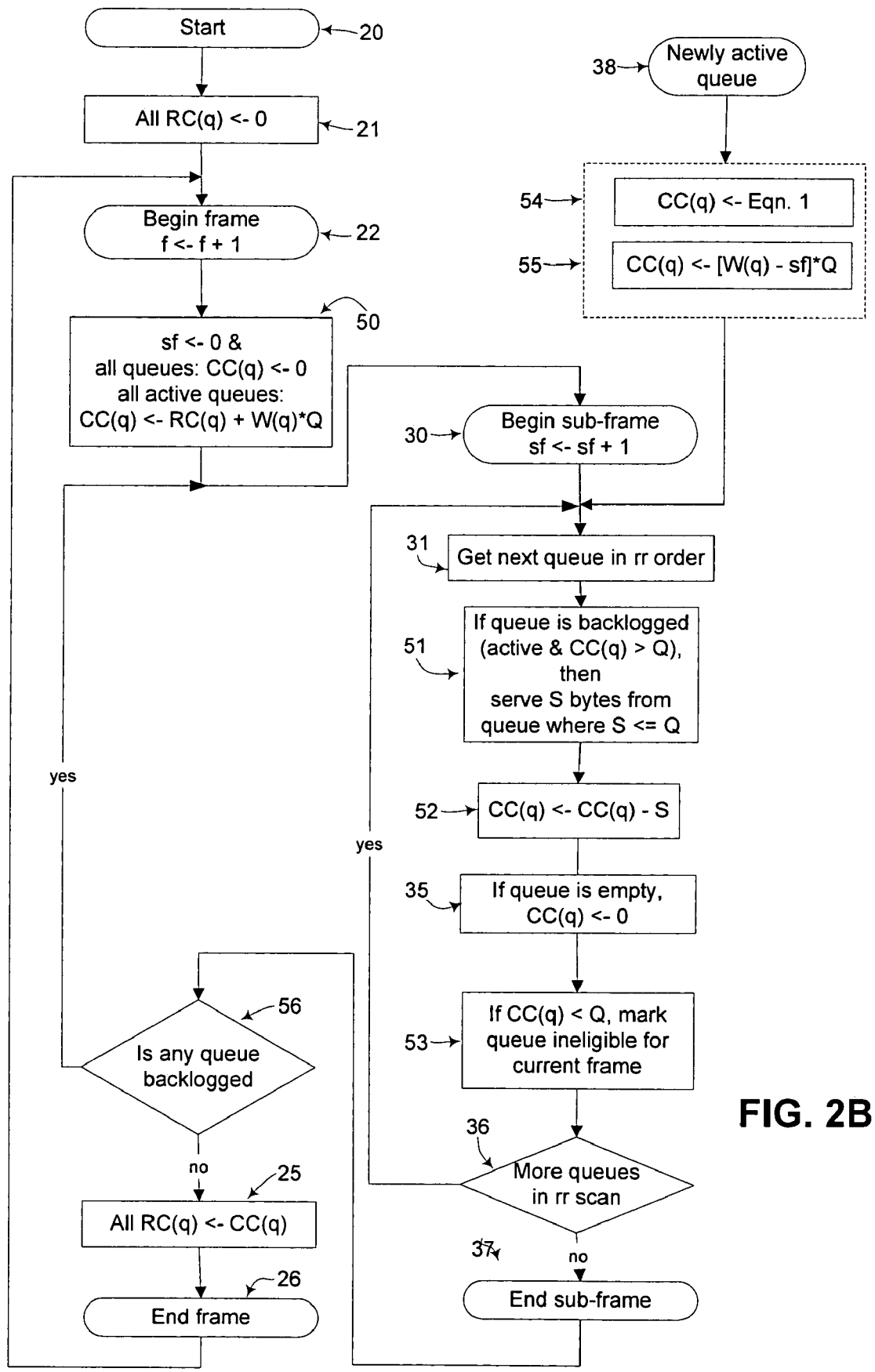

The present invention may be understood more fully by reference to the following detailed description of the preferred embodiment of the present invention, illustrative examples of specific embodiments of the invention and the appended figures ("backlogged" is abbreviated as "b'lggd", and assignment of the quantity B to the variable A is demoted as "A<–B") in which:

FIG. 1 illustrates an exemplary system of the present invention;

FIGS. 2A-B illustrate preferred embodiments of the methods of the present invention.

5. DETAILED DESCRIPTION OF THE PREFERRED EMBODIMENTS

Described next are preferred methods and systems of this invention. Although these embodiments are largely directed to scheduling data packets in communications processors, switches, and the like, these methods are not limited to communication applications, but may also be applied in other types of computer systems.

Systems for Practicing the Present Invention

FIG. 1 illustrates an exemplary communication system 1 suitable for the methods of the present invention. System 1 may either be a complete, standalone switch or router, or may be a sub-system, sub-assembly, or even a communication card in a standalone system. Inputs 2 present communication packets (the work requests of this application) that must be routed/switched to outputs 3. Preferably, the input packets are logically or physically divided into a plurality of classes, with each class having particular and typically heterogeneous scheduling requirements (also referred to as quality-of-service ("QOS") requirements). Physical inputs and outputs may be communication links for, e.g., LANs, wide area network links, switch threads, and so forth. Such a communication processor will typically have facilities for storing (queuing) communication packets prior to scheduling, for selecting packets for transmission through the processor, and for outputting the packets. It will also typically have facilities for loading controlling software by known means.

For example, exemplary system 1 stores work requests in buffers 8, which are allocated in memory 5 and are logically or physically arranged into a plurality of queues. Each individual queue typically stores in a FIFO order communication packets with homogenous scheduling characteristics and (QOS) requirements. Queued requests are selected and scheduled by control processor 6 executing this invention's methods which are encoded in processor instructions residing in control instruction store 7, which may be, e.g., RAM or ROM. Scheduling methods refer to both global scheduling parameters 10 and per-scheduling-queue scheduling data 9. After scheduling and selection, output processor 5 processes or transmits the scheduled communication packet, which is then output over outputs 3.

One of ordinary skill in the art will appreciate various alternative configurations also suitable for the present invention. For example, memory 4 and control store 7 may be combined as single physical memory; control processor 6 and work unit processor 7 may be combined as a single physical processor; control processor 6 and control store 7 may be implemented by a specially configured integrated circuit. Also, more than one scheduler may by implemented on each system.

Methods of the Present Invention

After reviewing some common terminology and features, the methods of this invention are now described beginning with reference to the exemplary system illustrated in FIG. 1. Supporting processing, such as buffer control, en-queueing and de-queueing, process scheduling and serialization, packet input and output processing, and the like, are understood to be implemented according to the state of the art and are not described herein. Further programming details are also not described herein. This invention's methods may be implemented using programming languages and techniques along with programming optimizations known in the art. For example, it is known how to enhance performance by keeping backlogged queues on an active list; how to reduce processing time by use of status bits; how to multi-thread processing; and the like.

The following terminology is used for consistency and concreteness but without limitation. An individual packet queue is referred to as "queue q", where "q" is a queue identifier, which is, for example, a number between 1 and N (where N queues are being processed). An "active" ("inactive") queue is one with at least one (without any) queued packets waiting for processing. A "backlogged" queue is an active queue that has not yet exhausted the service assigned to it at the start of the current frame.

Briefly, a frame is a time period during which a scheduler of this invention grants each backlogged queue an assigned amount of service. At the start of a frame, each queue is assigned a predetermined amount of service. The predetermined assigned service is often, but not exclusively, $Q*W(q)$, where "$W(q)$" is a (preferably integer) value predetermined for each queue and where "$Q$" is the service quantum. $Q$ may be fixed for an entire system, or may vary among different schedulers on one system, or may vary according to the characteristics of particular communications links. A frame ends when all backlogged queues have received their assigned service. A frame is divided into one or more sub-frames during which each backlogged queue is granted up to $Q$ service in RR order.

Certain embodiments also maintain a current credit counter, $CC(q)$, for each queue, which is initialized at the start of each frame and is incremented or decremented as described below during the sub-frames. $CC(q)$ at the end of a frame may be saved as a residual credit, $RC(q)$, used in initializing the next frame. Certain embodiments also maintain a running count, "sf", of the number of sub-frames processed in each frame sf is limited to not exceed the number of quanta $Q$ required to provide a queue with its assigned service assigned in frame f. Credit counts could optionally also be traced by sf.

First Embodiment

Generally, a first preferred embodiment uses a current credit counter, $CC(q)$, and a service counter, $w(q)$, to track service assigned and used by queue q in each frame. At the start of a frame, $w(q)$ for queue q is initialized to that queue's predetermined service $W(q)$, and during the frame's sub-frames is decremented when queue q is granted service quantum $Q$. $CC(q)$ is used to track the service assigned but not actually used. Further, $w(q)$ is updated in dependence on $CC(q)$, being increased if $CC(q)$ becomes sufficiently large, in order that each queue q is able to actually use as much of its predetermined service as possible.

FIG. 2A illustrates this first embodiment. The scheduler method starts at 20 and performs necessary initialization 21, including setting all $RC(q)$ (residual credits) and f (frame counter) to zero and obtaining scheduler control parameters, including at least N (the number of queues), $W(q)$'s (assigned service per frame per queue), $Q$ (service quantum), and so forth. Next, the scheduler processes one or more frames, each frame includes the steps between begin frame 22, which increments frame counter, f, and end frame 26. In turn, during each frame, the scheduler performs frame initialization 23, processes one or more sub-frames, and performs frame termination 25 A frame ends when test 24 determines that there are no more backlogged queues (an active queue (a queue with pending packets) with unused service remaining). For each sub-frame, the scheduler processes the steps between begin sub-frame 30, which increments sub-frame counter, sf, and end sub-frame 37.

During frame initialization 23, the variables which control sub-frame processing are initialized. sf is initialized to zero. For each queue q, running service counter $w(q)$ is set to assigned frame service, $W(q)$. Both $w(q)$ and $W(q)$ are preferably measured as an integer number of service quantum, $Q$. If q is not backlogged, current credit counter, $CC(q)$, is set to zero; if q is backlogged, then it is set to the sum of the residual credit from the last frame, $RC(q)$, and the service assigned in the new frame, $Q*W(q)$. Thus, $CC(q)$ is preferably measured in the same units as is $Q$. This initialization will be seen to have the effect that a queue not backlogged at the beginning of a frame is skipped in subsequent scheduling decisions.

A frame terminates, evaluates at 24, when there are no backlogged queues, this is queues with both pending packets (active) and with available assigned service. Since the running counters, $w(q)$, are decremented during sub-frame processing, queue q has remaining assigned service if w(q)>0 and has exhausted its service if w(q)=0. Thus, specifically, a frame terminates when each queue q either has no pending packets or has exhausted its assigned services w(q)=0 (whether or not is has pending packets). The final step in a frame, 25, then saves sets all RC(q) to the current CC(q). Note that, if queue q became empty during the frame, its RC(q) will then be zero. The RC(q) variables are used here for clarity, and one of skill in the art will immediately appreciate that only the CC(q) are required in an actual implementation.

Test 36 checks if all the queues have been processed once, and if so the current sub-frame ends 37. In other words, a sub-frame ends when all queues with pending requests and available service are granted one quantum of service, albeit a queue may be served less than a quantum. Step 31 may be made more efficient by use of active lists, status bits, and the like.

Turning now to sub-frame processing, sub-frame initialization 30 increments sf (sub-frame counter). Next, steps 31 and 36 provide that each queue is processed in RR order by steps 32, 34, and 35. The first step, 32, tests if queue q, which has just been selected in RR order, is backlogged, that is it has queued (pending) packets and has service remaining in the current frame, w(q)>0. If so, then, queue q will be granted (using the necessary hardware/software commands) up to the service quantum Q of service. The pending request on queue q will then use the actual service, S, it needs, but in any case no more service than Q. Thus S may be any number no greater than Q. For communication packets where Q is preferably a determined number of bytes, up to Q bytes of the cell (or packet, packet segment, or the like) that is first on queue q will be transmitted. S bytes may come from multiple packets stored on the queue, such that S equals to the total number of bytes in the served packets, which must be no greater than Q, where Q is greater or equal to the total number of bytes of the served packets and less than the total number of bytes in served packets plus the number of bytes of one additional packet in this queue, if available. If this queue is not backlogged, then it will receive no service (even if it is active) and steps 34 and 35 will be bypassed.

Next, if queue q has received actual service, that is, if S>0, CC(q) and w(q) are appropriately updated 34. First, if queue q has become empty, then CC(q) will be set to zero (step 35); else S is subtracted from CC(q) (step 34). Next, w(q) is updated, usually by subtracting one. But, if CC(q) is sufficiently large (for example, if the previous service amounts S have been small), so that the largest integer less than CC(q)/Q (the "floor") is larger than w(q)−1, then w(q) will be set to floor(CC(q)/Q). If Q is a power of two, this division may be efficiently done by a simple shift operation.

As a consequence of this method, it can be shown that at the end of each frame CC (q)<Q. In fact, if CC(q)>Q, then during a sub-frame queue q will always be selected (because the largest integer less than CC(q)/Q is greater than 1) to receive another service quantum whether or not its assigned service has already been exhausted (because the largest integer less than CC(q)/Q will then be 1 so will w(q) on completion of step 34). Thus, no queue will ever lose more than an amount of service greater than Q solely by virtue of a disadvantageous distribution of packet sizes.

When a formerly inactive queue q becomes newly active 38, its running service counter w(q) is initialized 39 to its assigned weight, W(q), minus the current sub-frame count, sf, and its CC(q) is correspondingly initialized to w(q)*Q. After initialization, the newly active queue is ready for processing in the current sub-frame, by, for example, being placed at the end of the active list, if one is maintained. In this case, it will receive service in this sub-frame; otherwise its first service may be in the next sub-frame. A queue that becomes active during the course of a frame is the same regardless of whether that queue was inactive at the start of the frame or whether it became inactive during the frame after having been initially active.

In other words, a newly active queue behaves as if it were active from the start of the frame, receiving a service quantum during each previous sub-frame. However, this service is of course not actually received and further is compensated. The queue may only be served in remaining sub-frames if it assigned weight is greater than the current sub-frame count so that its new w(q)>0. If queue q has weight of W(q) and it is inactive during the first W(q) sub-frames, it will get no service in this frame, because w(q) initialized to zero or less. For similar reasons, if the queue becomes idle after certain number of sub-frames, then it will continue to lose service as the sub-frame count increases. Later on when it becomes backlogged again it may not be able to get any service. Lastly, a queue may simultaneously use up all assigned service and become inactive. In this case, even if the queue subsequently becomes backlogged, it will receive no service in the current frame.

Further Embodiments

FIG. 2B illustrates additional preferred embodiments. Differences between the embodiments illustrated in FIGS. 2A and 2B are limited to steps 50-56, to which the present description is largely limited. Identically number steps in these figures perform substantially similar functions.

A second preferred embodiment makes all scheduling decisions in dependence only on the running credit counters, CC(q), and dispenses with the running service counters, w(q). Generally, compared to the first embodiment, this latter embodiment requires less computation for routine frame and sub-frame processing but requires more processing for initializing newly backlogged queues in order to give them accurate bandwidth allocations.

Frame initialization step 50 (replacing step 23 of FIG. 2A) which initializes CC(q) to the same values as does step 23 of the first embodiment. For queues active at the start of a frame, CC(q) is initialized to RC(q) plus the newly available service, Q*W(q); for queues not active at the start of a frame, CC(q) is initialized to zero. w(q)'s are not used and therefore are not computed. W(q) is preferably measured as an integer number of service quantum, Q, while CC(q) is preferably measured in the same units as is Q (e.g., bytes). As in the first embodiment, sub-frames are processed until there are no backlogged queues, that is active queues (queues with pending packets) with available service. Because now a queue has exhausted its available service only when its CC(q)<Q, test 24 is replaced by test 56, which performs this latter test. If there are no such queues, the frame terminates 25 and 26.

During sub-frame processing, as in the first embodiment, all queues are scanned in a RR order and any queue backlogged queue found (with pending requests and available service) is scheduled to receive service S up to service quantum Q. Because now a queue has exhausted its available service only when its CC(q)>Q, step 32 is replaced by step 51, which performs this latter test. Once again, S bytes may come from multiple packets stored on the queue, such that S equals to the total number of bytes in the served packets, which must be no greater than Q, where Q is greater or equal to the total number of bytes of the served packets and less than the total number of bytes in served packets plus the number of bytes of one additional packet in this queue, if available. Step 52 updates CC(q) by simply subtracting the actual service received, S. As a result of this embodiment, no queue will lose more than a service quantum of service solely due to a disadvantageous packet size arrival distribution.

New step 53 marks queue q ineligible, preferably by setting a status bit, for further processing in this frame if CC(q) drops below Q. All subsequent processing for this frame may then skip queue q simply by testing a status bit. Service ineligibility is reset when appropriate, for example, at the start of a new frame. Another example of a performance enhancement is an active queue list, which links all active queues together. Without such a list, an active queue may be found only by scanning all pending requests in all queues.

Finally, this embodiment initializes CC(q) 54 of a queue q newly active in the current frame 38 with an amount of service for the remainder of the current frame that is approximately proportional to the service remaining in the current frame for all the already-active queues, where the constant of proportionality is the ratio of the assigned predetermined service weight of the newly active queue to the sum of the predetermined service weights of all queues. Specifically, this initialization is performed according to Eqn. 1.

$$CC(\text{newly\_b'lggd}) = \left\lfloor \left( \frac{W(\text{newly\_b'lggd})}{\sum_q W(q)} \right) * \sum_q CC(q) \right\rfloor \quad \text{(Eqn. 1)}$$

differently from the first embodiment. If CC(q) is initialized to less than Q, then queue q will receive no service in the current frame. The newly active queue is preferably then inserted at the end of the active queue list so, that it will be considered for service in the current frame and sub-frame. The computation in Eqn. 1 can be simplified by quantizing the sum of weights and sum of credits to powers of 2.

The third preferred embodiment is substantially similar to the second embodiment with the single exception of initialization of CC(q) for a newly active queue. Simply, the current credit, CC(q), of newly active queue q is initialized to the difference between the newly active queue's service weight W(q) and the current sub-frame count, sf, times the service quantum Q. Thus, a newly backlogged queue will receive service in the current frame if its assigned service weight W(q) is larger than or equal to the current sub-frame count sf, and each queue will be assigned a fair amount of service in each frame regardless of how many times it goes inactive and then subsequently active.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

Especially, although the preferred embodiments of the present invention described herein include certain modification and improvements to round-robin methods, it should be understood that this invention also includes other embodiments with other combinations and sub-combinations of these modification and improvements. Such alternative methods may provide different combinations of efficiency and fairness suitable to different applications. For example, although the preferred embodiments are particularly advantageous for scheduling variable sized packets or work units, they and their alternatives may also be used for effectively scheduling fixed size packets or work units.

We claim:

1. A communication system in which service measured in service units is granted to queues of communications data packets comprising:
   (a) a memory storing data packets arranged on a plurality of data packet queues, and for each queue, indicia of a number of remaining service quanta and of a number of remaining service units, wherein a service quantum is a pre-determined number of service units; and
   (b) a processor performing one or more scheduler periods, wherein a scheduler period comprises the steps of:
      (i) initializing each active queue's indicia to a pre-determined number of remaining service quanta for that queue and a pre-determined number of remaining service units for that queue, wherein a queue is active if it has one or more packets,
      (ii) selecting once in a pre-determined order each queue of the plurality of queues that is active and that has remaining service quanta, and granting up to one quantum of service units to the selected queue; and updating the selected queue's remaining service units by subtracting the service units actually used out of the granted quantum of service units; and updating the selected queue's remaining service quanta to be equal to the greater of the number of remaining service quanta minus one and the number of remaining service quanta in the updated remaining service units, and
      (iii) repeating the step of selecting until there are no active queues with remaining service quanta.

2. The system of claim 1 wherein the number of remaining service quanta in the updated remaining service units is the largest integer less than or equal to the result of dividing the updated remaining service units by the number of service units in the service quantum.

3. The system of claim 1 wherein the pre-determined number of remaining service units for a queue is initialized by multiplying the pre-determined number of service quanta for that queue by the number of service units in a service quantum.

4. The system of claim 1 wherein the processor further initializes the indicia of a queue that was not active when initialization of a scheduler period was performed but that becomes active during the scheduler period so that the newly active queue is eligible for processing during the current scheduler period, wherein the newly active queue's remaining service quanta are set to the pre-determined number of service quanta minus for that queue minus the number of repetitions of the step of selecting already accomplished during the current scheduler period and the newly active queue's remaining service units are set to the product of the initialized remaining service quanta by the number of service units in a service quantum.

5. The system of claim 1 wherein at least one queue has pre-determined number of service quanta that differs from the pre-determined number of service quanta of at least one other queue.

6. A communications system in which service measured in service units is granted to queues of communications data packets comprising:
   (a) a memory storing data packets arranged on a plurality of data packet queues, and for each queue, indicia of a number of remaining service units; and (b) a processor performing one or more scheduler periods, wherein a scheduler period comprises the steps of:
  (i) initializing each active queue's indicia to a pre-determined number of remaining service units for that queue, wherein a queue is active if it has one or more packets,
  (ii) selecting once in a pre-determined order each queue of the plurality of queues that is active and that has remaining service units equaling or exceeding a service quantum, wherein a service quantum is a pre-determined number of service units, and granting up to one quantum of service units to the selected queue, and updating the selected queue's remaining service units by subtracting the service units actually used out of the granted quantum of service units
  (iii) repeating the step of selecting until there are no active queues with remaining service units equaling or exceeding a service quantum.

7. The system of claim 6 wherein a scheduler period comprises one or more scheduler sub-periods, wherein a scheduler sub-period comprises one selecting step.

8. The system of claim 6 wherein the pre-determined number of service units for a queue is determined by multiplying a pre-determined number of service quanta for that queue by the number of service units in a service quantum.

9. The system of claim 8 wherein the processor further initializes the indicia of a queue that was not active when initialization of a scheduler period was performed but that becomes active during the scheduler period so that the newly active queue is eligible for processing during the current scheduler period, wherein the newly active queue's remaining service units are set to the product of the pre-determined number of service quanta for that queue minus the number of repetitions of the step of selecting already accomplished during the current scheduler period by the number of service units in a service quantum.

10. The system of claim 7 wherein the processor further initializes the indicia of a queue that was not active when initialization of a scheduler period was performed but that becomes active during the scheduler period so that the newly active queue is eligible for processing during the current scheduler period, wherein the newly active queue's remaining service units are set to a number proportional to the sum of the remaining service units of all queues, the constant of proportionality being the ratio of the pre-determined number of service quanta assigned to the newly active queue to the sum of the pre-determined service quanta assigned to all queues.

11. The system of claim 6 wherein at least one queue has pre-determined number of service units that differs from the pre-determined number of service units of at least one other queue.

12. A work scheduling method for a computer system comprising a memory storing work requests arranged on a plurality of queues, each queue having associated available service information, the method comprising performing one or more scheduler periods, wherein a scheduler period comprises the steps of:
  (a) for each active queue, initializing the available service information to reflect a pre-determined amount of service available to that queue during the current scheduler period, wherein a queue is active if it has one or more work requests;
  (b) selecting once in a pre-determined order each queue of the plurality of queues that is active and that has available service, and granting up to a quantum of service to the selected queue, wherein a service quantum is a pre-determined amount of service; and updating the selected queue's available service to reflect the service actually used by the selected queue out of the granted quantum of service, and
  (c) repeating the step of selecting until there are no more active queues with available remaining service equaling or exceeding the service quantum.

13. The system of claim 12 wherein at least one queue has pre-determined amount of service that differs from the pre-determined amount of service of at least one other queue.

14. The method of claim 12 wherein, for at least one active queue, the service information is initialized in dependence on both the queue's pre-determined amount of service and the queue's available service remaining from the immediately prior scheduling period.

15. The method of claim 12 wherein the service quantum is a pre-determined number of service credits; and wherein, for at least one queue, the available service comprises a number of available service credits and a number of available service quanta.

16. The method of claim 15 wherein the available service quanta are initialized to a pre-determined number of service quanta for that queue, and wherein the available service credits are initialized to the product of the pre-determined number of service quanta and of the number of service credits in a service quantum; and wherein the available service credits are updated by subtracting from the prior available service credits the service credits actually used out of the granted quantum of service credits; and wherein the available service quanta are updated to be equal to the greater of the number of available service quanta minus one and the number of available service quanta in the updated available service credits; and wherein the step of selecting is repeated until there are no active queues with available service quanta.

17. The method of claim 15 wherein the available service quanta are initialized to a pre-determined number of service quanta for that queue; and wherein the available service credits are initialized to the product of the pre-determined number of service quanta and of the number of service credits in a service quantum; and wherein the available service credits are updated by subtracting from the prior available service credits the service credits actually used out of the granted quantum of service credits; and wherein the step of selecting is repeated until there are no queues with available service credits equal to or greater than a service quantum.

18. The method of claim 15 further comprising initializing the service information of a queue that was not active when initialization of a scheduler period was performed but that becomes active during the scheduler period so that the newly active queue is eligible for processing during the current scheduler period, wherein the newly active queue's available service quanta are set the pre-determined number of service quanta for that queue minus the number of times the step of selecting has been actually performed during the current scheduler period; and wherein the newly active queue's available service credits are set to the product of the queue's initialized service quanta and number of service credits in a service quantum.

19. The method of claim 12 wherein a service quantum is a pre-determined number of service credits; and wherein, for at least one queue, the available service comprises a number of available service credits; and wherein the step of selecting is repeated until there are no active queues with available service credits equal to or greater than a service quantum.

20. The method of claim 19 wherein the available service credits are initialized to the product of the a pre-determined number of service quanta for that queue and of the number of service credits in a service quantum; and wherein the available service credits are updated by subtracting from the prior available service credits the service credits actually used out of the granted quantum of service credits.

21. The method of claim 19 further comprising initializing the service information of a queue that was not active when initialization of a scheduler period was performed but that becomes active during the scheduler period so that the newly active queue is eligible for processing during the current scheduler period, wherein the newly active queue's available service credits are set to the product of the number of service credits in a service quantum and that queue's pre-determined number of service quanta minus the number of times the step of selecting has been actually performed during the current scheduler period.

22. The method of claim 12 wherein service is measured in units of processor time.

23. The method of claim 12 wherein service is measured in units of bytes transmitted.

* * * * *